United States Patent Office 2,747,075
Patented May 22, 1956

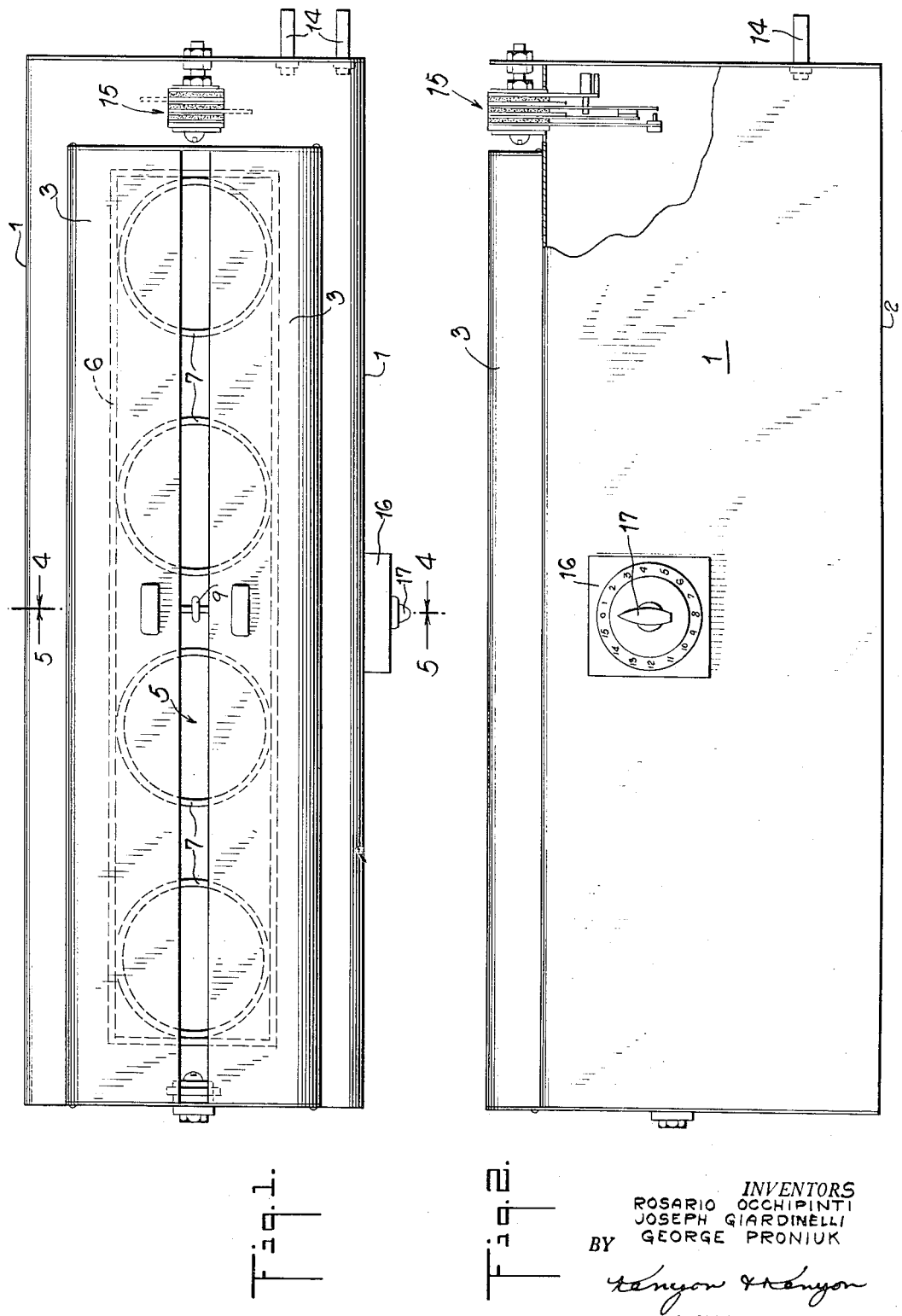

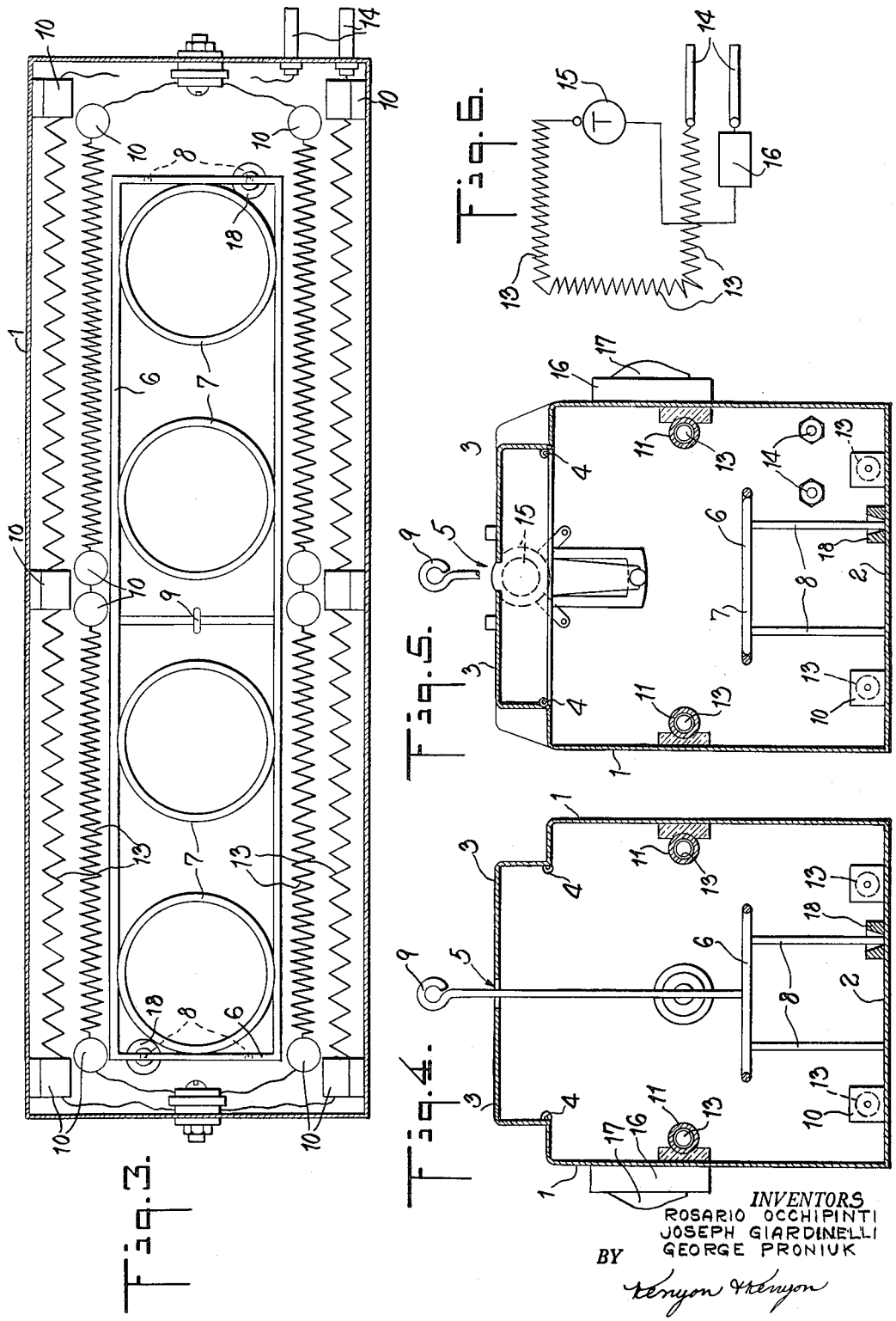

2,747,075

EGG COOKER

Rosario Occhipinti, Joseph Giardinelli, and George Proniuk, New York, N. Y.

Application July 17, 1953, Serial No. 368,594

4 Claims. (Cl. 219—35)

This invention relates to an egg cooker and, in particular, it relates to a means for cooking eggs electrically by the direct application of uniform heat.

In cooking whole eggs in their shells, it has been the general practice to immerse the eggs in hot water and to allow the eggs to remain therein for a period of time sufficient to produce a boiled egg of the desired hardness. We have found that it is possible and more practical to cook whole eggs by the use of direct heat rather than by the use of hot water.

Among the objects of our invention are: to provide means for cooking whole eggs in the shell by the use of direct heat, thus eliminating the necessity of using hot water; to provide means for cooking whole eggs in the shell by a uniform direct heat which results in an evenly cooked egg; to provide means for cooking whole eggs in the shell at a regulated temperature below a critical temperature at which the shell of the eggs will crack during cooking; to provide means for cooking whole eggs without necessitating the pricking of the egg shell prior to cooking to prevent the shell from cracking; to provide means for cooking whole eggs which will automatically cook the eggs a predetermined time; and to provide an egg cooker which will operate quickly and easily and with a minimum of precooking preparations.

These and other objects and advantages will appear more fully in the following detailed description when considered in connection with the accompanying drawings in which:

Figure 1 is a plan view, of an egg cooker forming one embodiment of our invention;

Figure 2 is a side elevational view thereof, partly in section;

Figure 3 is a cross sectional view taken along lines 3—3 of Figure 2;

Figure 4 is an end elevational view thereof, in section;

Figure 5 is an end elevational view thereof, partly in section; and

Figure 6 is a diagram of the electrical circuit.

With reference to the drawings, we show an embodiment of our invention in the form of an egg cooker in which four eggs may be cooked simultaneously. While we have shown a device capable of cooking four eggs simultaneously, it should be understood that the device as shown is capable of cooking any number of eggs up through four simultaneously and may be constructed to cook any reasonable number of eggs simultaneously.

The cooking oven in enclosed on the sides by four vertical walls, 1, and at the base by a horizontal wall, 2. The cover doors, 3, are pivotally attached to opposite vertical walls, 1, by means of hinges, 4. The cover doors, 3, are so positioned that in closed position there is a vent, 5, extending lengthwise of the cover doors. The egg tray, 6, is adapted to hold whole eggs in the circular shaped wire holders 7. The egg tray, 6, holds the eggs in spaced relation to the walls of the oven by means of the legs, 8. The guides, 18, act to guide the egg tray, 6, into proper spaced position. The egg tray may be positioned and removed from the oven by use of a handle, 9, which extends through the vent in the covers to allow the atmosphere to aid in maintaining the handle at room temperature. It is possible to remove the egg tray, 6, from the oven and set it on any level surface without disturbing the eggs from their holders, 7, thus allowing the operator to remove the eggs after cooking without touching them and allowing them to stand and cook prior to touching them.

There are a plurality of insulated brackets, 10, attached to the vertical walls by means of metal bands, 11, and screws, 12. These insulated brackets, 10, are adapted to hold the electrical heating coils, 13, in spaced vertical relation to each other and in spaced relation from the vertical walls, 1. These heating coils, 13, are connected in series and when electrically energized provide the source of heat for heating the oven. In order to produce and maintain a uniform heat in the oven and thus heat and cook the eggs in a uniform manner, it is necessary that the uppermost heating coil, 13, have fewer coils per inch of laterally traverse than the lowermost coil, 13. A preferred ratio is a ratio of 5 to 9 as between the coils per lateral inch of traverse of the uppermost heating coil to the coils per lateral inch of traverse of the lowermost heating coil. An ordinary male socket, 14, is utilized to connect the heating coils, 13, with an external means of energizing the heating coils.

A thermostat, 15, is connected in series with the heating coils and the means of energizing the heating coils. This thermostate, 15, is adapted to make and break the series circuit, such making and breaking being determined and regulated by the temperature of the oven. We have determined that 520° F. is a critical temperature because if the oven temperature rises substantially above 520° F., the shell of the egg will crack which is undesirable. In accordance with this finding we prefer to set the thermostat, 15, to maintain the oven heat in the range of 400° to 490° F. We have further found that the operation of the thermostat, 15, is much more efficient if the regulating portion of the thermostat is exposed to the atmosphere. This is true because this exposure facilitates a uniform flow of heat from the regulating portion of the thermostat due to the relatively uniform temperature of the atmosphere. In accordance with this finding we preferably construct our egg cooker with the regulating portion of the thermostat, 15, extending through the walls of the oven and exposed to the atmosphere.

A conventional timer, 16, may be connected in series with the heating coils, 13, the thermostat, 15, and the energizing means socket, 14. This timer disconnects the heating coils and thermostat from the energizing means when the pointer, 17, points to the zero or off position. When the pointer, 17, is manually swung clockwise to a desired time setting the circuit between the heating coils, the thermostat, and the means of energizing the circuit is connected. The pointer, 17, is then rotated at a predetermined rate in a counterclockwise direction until it points to off or zero at which time the circuit is again disconnected. Thus, the timer, 16, is a means of regulating the time of cooking the eggs and of automatically de-energizing the heating coil circuit after a predetermined time.

With reference to Figure 6 we show a circuit diagram for electrically connecting the various electrical components. The male socket, 14, would be connected to an electrical energizing means, the timer, 16, is connected in series with the heating coils, 13, and in series with the thermostat, 15.

As thus shown and described, it is believed apparent that we have provided a novel arrangement for cooking eggs in which, by a simple manual setting of the timer and insertion of one or more eggs into the oven by means of the removable tray, a completely automatic function takes place whereby the inserted eggs are cooked for a predetermined time and at a predetermined, uniform temperature.

While we have shown a preferred embodiment of our invention, it is to be understood that it is susceptible of those modifications which appear to be obviously within the spirit and scope of the invention.

We claim:

1. A device for cooking eggs comprising an oven enclosed on four sides and at the bottom by solid walls, partially enclosed at the top by a pair of doors attached to opposite vertical walls of the oven by means of hinges and adapted to open and close by pivoting upon the hinges, the doors in closed position being spaced apart from each other slightly to provide a vent lengthwise of the doors, an egg tray adapted to hold whole eggs in spaced relation to the walls of the oven, a number of insulated brackets attached to the vertical walls of the oven, a pair of electrical heating coils connected in series extending around the inside of the vertical walls held in spaced vertical relation and spaced relation to the verticial walls by the insulated brackets, the uppermost electrical heating coil having fewer coils per inch of lateral traverse than the lowermost electrical heating coil, and a means for electrically energizing the electrical heating coils.

2. A device for cooking eggs comprising an oven enclosed on four sides and at the bottom by solid walls, partially enclosed at the top by a pair of doors attached to opposite vertical walls of the oven by means of hinges and adapted to open and close by pivoting upon the hinges, the doors in closed position being spaced apart from each other slightly to provide a vent lengthwise of the doors, an egg tray adapted to hold whole eggs in spaced relation to the walls of the oven, a number of insulated brackets attached to the vertical walls of the oven, a pair of electrical heating coils connected in series extending around the inside of the vertical walls held in spaced vertical relation and spaced relation to the vertical walls by the insulated brackets, the uppermost electrical heating coil having fewer coils per inch of lateral traverse than the lowermost electrical heating coil, a thermostat connected in series with the electrical heating coils adapted to regulate the temperature of the oven at a temperature range of 400° to 490° F., and a means for electrically energizing the electrical heating coils.

3. A device for cooking eggs comprising an oven enclosed on four sides and at the bottom by solid walls, partially enclosed at the top by a pair of doors attached to opposite vertical walls of the oven by means of hinges and adapted to open and close by pivoting upon the hinges, the door in closed position being spaced apart from each other slightly to provide a vent lengthwise of the doors, an egg tray adapted to hold whole eggs in spaced relation to the walls of the oven, a number of insulated brackets attached to the vertical walls of the oven, a pair of electrical heating coils connected in series extending around the inside of the vertical walls held in spaced vertical relation and spaced relation to the vertical walls by the insulated brackets, the uppermost electrical heating coil having fewer coils per inch of lateral traverse than the lowermost electrical heating coil, a thermostat connected in series with the electrical heating coils adapted to regulate the temperature of the oven at a temperature range of 400° to 490° F., the thermostat being positioned with one half of its mechanism outside the oven and the other half inside the oven, and a means for electrically energizing the electrical heating coils.

4. A device for cooking eggs comprising an oven enclosed on four sides and at the bottom by solid walls, partially enclosed at the top by a pair of doors attached to opposite vertical walls of the oven by means of hinges and adapted to open and close by pivoting upon the hinges, the doors in closed position being spaced apart from each other slightly to provide a vent lengthwise of the doors, an egg tray adapted to hold whole eggs in spaced relation to the walls of the oven, a number of insulated brackets attached to the vertical walls of the oven, a pair of electrical heating coils connected in series extending around the inside of the vertical walls held in spaced vertical relation and spaced relation to the vertical walls by the insulated brackets, the uppermost electrical heating coil having fewer coils per inch of lateral traverse than the lowermost electrical heating coil, a thermostat connected in series with the electrical heating coils adapted to regulate the temperature of the oven at a temperature range of 400° to 490° F., the thermostat being positioned with one half of its mechanism outside the oven and the other half inside the oven, a means for electrically energizing the electrical heating coils and a timer adapted to connect and disconnect the series circuit between the electrical energizing means and the electrical heating coils, the time interval between the connection and disconnection being regulated.

References Cited in the file of this patent

UNITED STATES PATENTS

| Number | Name | Date |
|---|---|---|
| 759,909 | Pelton | May 17, 1904 |
| 999,257 | Radtke | Aug. 1, 1911 |
| 1,460,140 | Penso | June 26, 1923 |
| 1,517,432 | Kayte | Dec. 2, 1924 |
| 1,739,062 | Connolly | Dec. 10, 1929 |
| 1,899,933 | Bennett | Mar. 7, 1933 |
| 1,981,578 | Baggiolini | Nov. 11, 1934 |
| 2,459,933 | Gomersall | Jan. 25, 1949 |
| 2,507,920 | McCormick | May 16, 1950 |
| 2,666,380 | Badenoch | Jan. 19, 1954 |
| 2,677,748 | Naylor | May 4, 1954 |